United States Patent
Zhou et al.

(10) Patent No.: US 10,613,788 B2
(45) Date of Patent: Apr. 7, 2020

(54) DATA MIGRATION BETWEEN CLOUD STORAGE SYSTEMS

(71) Applicant: BEIJING BAIDU NETCOM SCIENCE AND TECHNOLOGY CO., LTD., Beijing (CN)

(72) Inventors: Fei Zhou, Beijing (CN); Xianhui Niu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 71 days.

(21) Appl. No.: 15/896,879

(22) Filed: Feb. 14, 2018

(65) Prior Publication Data

US 2018/0232174 A1 Aug. 16, 2018

(30) Foreign Application Priority Data

Feb. 15, 2017 (CN) .......................... 2017 1 0081599

(51) Int. Cl.
| | |
|---|---|
| *G06F 12/00* | (2006.01) |
| *G06F 3/06* | (2006.01) |
| *H04L 29/08* | (2006.01) |

(52) U.S. Cl.
CPC ............ *G06F 3/0647* (2013.01); *G06F 3/061* (2013.01); *G06F 3/0604* (2013.01); *G06F 3/067* (2013.01); *G06F 3/0619* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 9,699,233 B1* | 7/2017 | Armorer | ................ H04L 47/12 |
| 2010/0082543 A1* | 4/2010 | Nagarajan | ............ G06F 3/0605 |
| | | | 707/640 |
| 2013/0219161 A1* | 8/2013 | Fontignie | .................. G06F 8/63 |
| | | | 713/2 |

(Continued)

FOREIGN PATENT DOCUMENTS

| | | |
|---|---|---|
| CN | 101299695 A | 11/2008 |
| CN | 103475682 A | 12/2013 |

(Continued)

*Primary Examiner* — John A Lane
(74) *Attorney, Agent, or Firm* — Marshall, Gerstein & Borun LLP

(57) ABSTRACT

The objective of the present invention is to provide a method, apparatus, system, computing device and computer-readable medium for data migration between cloud storage systems. Here, a user equipment generates, according to a list of to-be-migrated files, descriptive information of each file in the list; and transmits one or more data migration requests to available server(s), respectively, such that the corresponding server performs data migration between different cloud storage systems, wherein each data migration request includes indication information of a source end and a destination end of the data migration and descriptive information of one or more to-be-migrated files. The present invention may satisfy various performance requirements on performance, flexibility, scalability, automation, data verify and framework universality, etc.

14 Claims, 3 Drawing Sheets

(56) References Cited

U.S. PATENT DOCUMENTS

| | | | | |
|---|---|---|---|---|
| 2014/0115161 A1* | 4/2014 | Agarwal | ............ | G06F 9/45558 |
| | | | | 709/226 |
| 2014/0344395 A1* | 11/2014 | Alexander | .............. | H04L 67/34 |
| | | | | 709/217 |
| 2016/0062805 A1* | 3/2016 | Kumar | .................. | G06F 9/5077 |
| | | | | 711/160 |
| 2016/0120070 A1* | 4/2016 | Myrah | ............... | H05K 7/20836 |
| | | | | 700/275 |
| 2017/0177649 A1* | 6/2017 | Badrinarayanan | .... | G06F 3/0617 |
| 2017/0351702 A1* | 12/2017 | Schaefer | ................. | G06F 16/27 |
| 2018/0034913 A1* | 2/2018 | Matthieu | ............... | H04L 67/125 |

FOREIGN PATENT DOCUMENTS

| | | |
|---|---|---|
| CN | 105872053 A | 8/2016 |
| CN | 106161516 A | 11/2016 |

\* cited by examiner

DATA MIGRATION BETWEEN CLOUD STORAGE SYSTEMS

CROSS-REFERENCE TO RELATED APPLICATIONS

This application is related to and claims priority from Chinese patent application no. 201710081599.X, filed with the state intellectual property office of the People's Republic of China (SIPO) on Feb. 15, 2017, the entire disclosure of the Chinese application is hereby incorporated by reference.

FIELD OF THE INVENTION

The present invention relates to the technical field of data migration, and more particularly to a technology for data migration between cloud storage systems.

BACKGROUND OF THE INVENTION

Cloud storage service provides a stable, secure, efficient and strongly scalable storage service. It not only directly provides services to users, but also provide a strong support to upper-layer services; therefore, it is a very important basic service in public cloud services.

An abundance number of cloud storage products are available in the market. With constant change of the market or the demands of cloud storage users, the cloud storage user may select different cloud storage services to use. This generates a demand of migrating data between different cloud storages, e.g., migrating data from Alibaba Cloud OSS to Baidu cloud BOS. For data migration between cloud storage systems, currently, different tools are all developed for specific systems and specific scenarios, e.g., the migration tool qrsync of Qiniu Cloud, the importer of Alibaba Cloud OSS. These migration tools read data from a specified source end, write them to a destination end, and then verify whether the data are correctly written into the destination end, thereby completing an action of data migration. Besides, based on the approaches of the various migration tools above, the data need to be written into a disk once, thereby generating an unnecessary disk I/O, and it is highly difficult to control the migration speed and scale.

However, in the cloud storage system, the data amount is tremendous, and a lot of uncertainties arise because the data migration between cloud storage systems is essentially interactivity over a network. Therefore, some important aspects should be considered during the process of data migration:

1) when the data amount is considerable, how to complete data migration at a fastest speed without affecting the current system, i.e., demands of high performance, controllable speed, and strong scalability;

2) capable of automatically/accurately implementing data migration under various complex uncertain circumstances such as network, i.e., demands of automation and strong verify;

3) a variety of cloud storage products are available on the market. However, if a migration tool supporting the above two aspects is developed for data migration between every two cloud storage systems, the development work will be repetitive and intensive, i.e., demands of universality of the migration framework.

Based on the considerations of the above aspects, the data migration between cloud storage systems faces huge challenges in performance, flexibility, scalability, automation, data verify and frame universality.

SUMMARY OF INVENTION

The objective of the present invention is to provide a method, apparatus, system, computing device and computer-readable medium for data migration between cloud storage systems.

According to one aspect of the present invention, a method for data migration between cloud storage systems is provided, wherein at a user equipment, the method comprises steps of:

generating, according to a list of to-be-migrated files, descriptive information of each file in the list; and transmitting one or more data migration requests to available server(s), respectively, such that the corresponding server performs data migration between different cloud storage systems, wherein each data migration request includes indication information of a source end and a destination end of the data migration and descriptive information of one or more to-be-migrated files.

According to one aspect of the present invention, a method for data migration between cloud storage systems is provided, wherein at a network device, the method comprises steps of:

determining the source end and the destination end of data migration as indicated by a data migration request according to the data migration request received from a user equipment;

retrieving descriptive information of one or more to-be-migrated files from the data migration request; and retrieving the one or more to-be-migrated files from the source end and writes it/them into the destination end.

According to one aspect of the present invention, an apparatus for data migration between cloud storage systems is provided, wherein the apparatus is arranged at a user equipment, the apparatus comprises:

a module for generating, according to a list of to-be-migrated files, descriptive information of each file in the list; and a module for transmitting one or more data migration requests to available server(s), respectively, such that the corresponding server performs data migration between different cloud storage systems, wherein each data migration request includes indication information of a source end and a destination end of the data migration and descriptive information of one or more to-be-migrated files.

According to one aspect of the present invention, an apparatus for data migration between cloud storage systems is provided is provided, wherein the apparatus is arranged at a network device, the apparatus comprises:

a module for determining the source end and the destination end of data migration as indicated by a data migration request according to the data migration request received from a user equipment;

a module for retrieving descriptive information of one or more to-be-migrated files from the data migration request; and a module for retrieving the one or more to-be-migrated files from the source end and writes it/them into the destination end.

According to one aspect of the present invention, a computing device is provided, wherein the computing device comprises storage, processor and computer program stored in the storage stores and executed by the processor, wherein, when the computer program is executed by the processor, the method for data migration between cloud storage systems at a user equipment according to one aspect of the present invention is being performed.

According to one aspect of the present invention, a computing device is provided, wherein the computing device comprises storage, processor and computer program stored in the storage stores and executed by the processor, wherein, when the computer program is executed by the processor, the method for data migration between cloud storage systems at a network device according to one aspect of the present invention is being performed.

According to one aspect of the present invention, a computer-readable medium is provided, which stores computer program, wherein, when the computer program is executed by processor, the method for data migration between cloud storage systems at a user equipment according to one aspect of the present invention is being performed.

According to one aspect of the present invention, a computer-readable medium is provided, which stores computer program, wherein, when the computer program is executed by processor, the method for data migration between cloud storage systems at a network device according to one aspect of the present invention is being performed.

Compared with the prior art, the present invention provides a universal solution for data migration between cloud storage systems. The present invention enables to multiplex core procedures of data migration between various kinds of cloud storage systems and may scale various data source ends and data destination ends, thereby providing a scheme of performing data migration between different cloud storage systems, which may satisfy various performance requirements on performance, flexibility, scalability, automation, data verify and framework universality, etc.

BRIEF DESCRIPTION OF THE ACCOMPANYING DRAWINGS

Other features, objectives and advantages of the present invention will become more apparent through reading the detailed depiction of the non-limiting embodiments with reference to the accompanying drawings.

In the drawings, same or like reference numerals represent same or similar components.

DETAILED DESCRIPTION OF THE PREFERRED EMBODIMENTS

Figure 1:
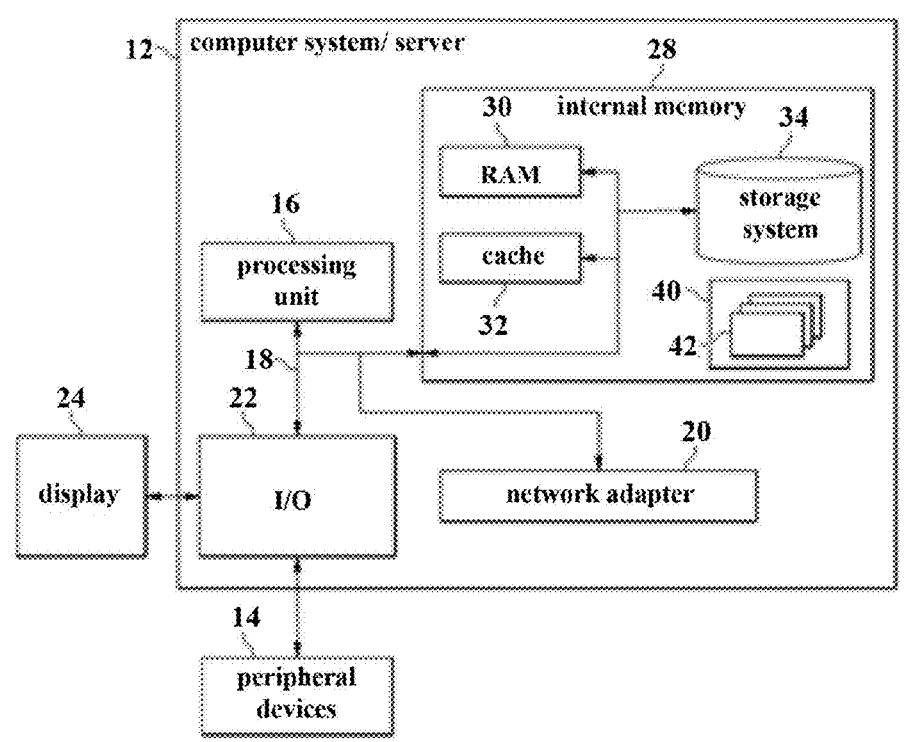
FIG. 1 shows a block diagram of an illustrative computer system/server 12 adapted to implement the preferred embodiments of the present invention.

Before discussing the illustrative embodiments in more details, it should be noted that some illustrative embodiments are described as processes or methods depicted as flow diagrams. Although the flow diagrams describe various operations as sequential processing, many operations therein may be implemented in parallel, concurrently or simultaneously. Besides, the sequence of various operations may be re-arranged. When the operations are completed, the processing may be terminated; besides, there may also include additional steps that are not included in the drawings. The processing may correspond to a method, a function, a specification, a sub-routine, a sub-program, etc.

The "computer device" herein (also referred to as "the computer") refers to a smart electronic device that may execute a predetermined processing process such as numerical computation and/or logic computation by running a predetermined program or instruction, which may comprise a processor and a memory, wherein the processor executes a program instruction pre-stored in the memory to execute the predetermined processing process, or executes the predetermined processing process using hardware such as ASIC, FPGA, and DSP, or executes by the combination of the two above. The computer device includes, but not limited to, a server, a personal computer (PC), a laptop computer, a tablet computer, a smart phone, etc.

The computer device for example includes a user equipment and a network device. Particularly, the user equipment includes, but not limited to, a personal computer (PC), a laptop computer, and a mobile terminal, etc.; the mobile terminal includes, but not limited to, a smart phone, a PDA, etc.; the network device includes, but not limited to, a single network server, a server group consisting of a plurality of network servers, or a cloud consisting a large number of computers or network servers based on cloud computing, wherein the cloud computing is a kind of distributed computing, i.e., a hypervisor consisting of a group of loosely coupled computer sets. Particularly, the computer device may operate to implement the present invention individually or may access to a network to implement the present invention through an interactive operation with other computer devices in the network. Particularly, the network where the computer device is located includes, but not limited to, the Internet, a Wide Area Network, a Metropolitan Area Network, a Local Area Network, a VPN network, etc.

It needs to be noted that the user equipment, network device, and network here are only examples, and other existing or future possibly emerging computer devices or networks, if applicable to the present invention, but also may be included within the protection scope of the present invention, which are incorporated here by reference.

The methods that will be discussed infra (some of which will be illustrated through flow diagrams) may be implemented through hardware, software, firmware, middleware, microcode, hardware descriptive language or any combination thereof. When they are implemented using software, firmware, middleware or microcode, the program codes or code segments for implementing essential tasks may be stored in a computer or computer readable medium (e.g., storage medium). (One or more) processors may implement essential tasks.

The specific structures and functional details disclosed here are only representative and intended to describe the illustrative embodiments of the present invention. Further, the present invention may be specifically implemented by a plurality of alternative modes and should not be construed to being only limited to the embodiments illustrated herein.

It should be understood that although terms like "first" and "second" may be used here to describe respective units, these units should not be limited by these terms. Use of these terms is only for distinguishing one unit from another unit. For example, without departing from the scope of illustrative embodiments, a first unit may be referred to as a second unit, and likewise the second unit may be referred to as the first unit. The term "and/or" used here includes any and all combinations of one or more associated items as listed.

The term used here is only for describing preferred embodiments, not intended to limit the illustrative embodiments. Unless otherwise indicated, a singular form "a(n)" or "one" used here is also intended to cover plurality. It should also be understood that the terms "comprise" and/or "include" as used here limit the presence of features, integers, steps, operations, units and/or components as stated, but do not exclude presence or addition of one or more other features, integers, steps, operations, units, components and/or combinations.

It should also be mentioned that in some alternative implementations, the functions/actions as mentioned may occur according to the sequences different from what are indicated in the drawings. For example, dependent on the functions/actions as involved, two successively indicated diagrams actually may be executed substantially simultaneously or sometimes may be executed in a reverse order.

Performing data migration between cloud memories is essentially reading the data from a source end and then writing the data into a destination end.

Therefore, the data source end should know which data need to be migrated, and have a method of obtaining the data and a method of obtaining a data "digest" (describing some basic information of the data); and the data destination end should have a method of depositing the data and a method of obtaining a data "digest."

Therefore, the present invention provides a universal data migration framework. The data migration framework comprises 3 main components: DataSource, DataDestination, and a data migration system (including a client and a migration server). Further, the present invention further defines a data "digest" (FD) describing basic information of data.

As mentioned above, regardless of migrating data from which cloud storage service to another cloud storage service; the whole process involves just reading data and writing data, and the migration speed may be controlled by controlling the number of concurrences. Moreover, the whole framework can be traffic-independent. The data migration system writes the data using a writing method of the migration server based on the FD provided by the DataSource. The whole process of data reading and data writing does not need to write the data of the DataSource into a disk at one time, but writes the data into the DataDestination by using a method of directly transferring the data to the migration server through the migration server. Further, after completing of writing into the DataDestination, the data migration system may also verify the written data according to its verify method. Therefore, the verify method can be traffic-dependent, i.e., it needs to be implemented by the traffic logic implementing the framework.

The data migration framework according to the present invention may be extended to various kinds of DataSources and DataDestinations. Because the core procedure of data migration between various cloud storage systems is multiplexed, when there is a new migration demand, it is only required to implement the DataSource, the DataDestination, and the corresponding data migration system according to the specifications of the data migration framework provided by the present invention, e.g., generating an FD according to a new DataSource, and performing data writing according to the writing method of the new DataDestination.

In a cloud storage system, the data amount to migrate is huge, usually at TB or even PB level; therefore, a plurality of isomorphic migration cores are needed to complete these tasks. The present invention provides a universal data migration scheme based on C—S structure, which may scale out a migration ability. Particularly, the migration server and the migration client communicate using an open source framework Thrift RPC; the migration core is implemented on migration servers, actual data migration tasks are implemented on migration servers, a plurality of isomorphic migration servers receive a migration request from the client, such that data migration between a plurality of different DataSources and the DataDestination may be implemented and various kinds of data migration requests may be accepted, on the migration server.

Hereinafter, the present invention will be described in further detail with reference to the accompanying drawings.

The present invention provides a data migration system applied between cloud storage systems. The data migration system comprises a client and a server, wherein the client is typically installed in a user equipment (e.g., a personal computer).

Here, the user equipment and the server may both be a general computing device, individually storing computer programs running respectively to cooperate to implement the data migration method of the present invention.

FIG. 1 shows a block diagram of an illustrative computer system/server 12 adapted to implement the embodiments of the present invention. The computer system/server 12 shown in FIG. 1 is merely an example, which should not bring about any limitation to the functions and use scopes of the embodiments of the present invention.

As shown in FIG. 1, the computer system/server 12 is embodied as a general computing device. Components of the computer system/server 12 may include, but not limited to: one or more processors or processing units 16, internal memory 28, and a bus 18 connecting different system assemblies (including internal memory 28 and a processing unit 16).

The bus 18 indicates one or several of several bus structures, including a memory bus or a memory controller, a peripheral bus, a graphical acceleration port, a processor or a local area bus of using any bus structure in a plurality of bus structures. For example, these hierarchical structures include, but not limited to, an Industry Standard Architecture (ISA) bus, a microchannel architecture structure (MAC) bus, an enhanced ISA bus, a video electronic standard association (VESA) local area bus and a peripheral component interconnect (PCI).

The computer system/server 12 typically comprises a plurality of computer system readable mediums. These mediums may be any available medium that can be accessed by the computer system/server 12, including a volatile or a non-volatile medium, a mobile or an immobile medium.

The internal memory 28 may include a computer system readable medium in a non-volatile memory form, e.g., a random access memory (RAM) 30 and/or a cache memory 32. The computer system/server 12 may further comprise other mobile/immobile, volatile/non-volatile computer system storage mediums. Only as an example, the storage system 34 may be used for reading and writing an immobile and non-volatile magnetic medium (not shown in FIG. 1, generally referred to as "a hard disk driver"). Although not shown in FIG. 1, a disk driver for reading and writing the mobile non-volatile disk (e.g., a "floppy") and an optical disk driver for reading and writing the mobile non-volatile optical disk (e.g., a CD-ROM, a DVD-ROM or other optimal medium) may be provided. In these cases, each driver may be connected with the bus 18 through one or more data medium interfaces. The internal memory 28 may include at least one program product, the program product having a group (e.g., at least one) program module, and these program modules are configured to execute functions of various embodiments of the present invention.

A program/utility tool 40 having a group (at least one) of program modules 42 may be stored in for example internal memory 28. Such a program module 42 includes, but not limited to, an operating system, one or more application programs, other program modules, and program data. Each of these examples or a certain combination thereof may include implementation of a network environment. The program module 42 usually executes the functions and/or methods in the embodiments described in the present invention.

The computer system/server 12 may also communicate with one or more peripheral devices 14 (e.g., a keyboard, a pointer device, a display 24) and may also communicate with one or more devices that enable a user to interact with the computer system/server 12, and/or communicate with any device (e.g., a network card, a modem) that enables the computer system/server 12 to communicate with one or more other computing devices. This communication may be performed via an input/output (I/O) interface 22. Moreover, the computer system/server 12 may also communicate with one or more networks (e.g., a local area network (LAN), a wide area network (WAN), and/or a public network, e.g., the Internet) via the network adapter 20. As shown in the figure, the network adapter 20 communicates with other modules of the computer system/server 12 via the bus 18. It should be understood that although not shown in FIG. 1, other hardware and/or software module may be used in conjunction with the computer system/server 12, including, but not limited to: a microcode, a device driver, a redundancy processing unit, an external disk driver array, a RAID system, a tape driver, and a data backup storage system, etc.

The processing unit 16 executes various functional applications and data processing by running a program stored in the internal memory 28. For example, when a computer system/server 12 is a user equipment (storing computer programs for executing various functions and processing of the client of the present invention), at least one another computer system/server 12 is a server (storing computer programs for executing various functions and processing of the server of the present invention), such that when the processing unit 16 of the user equipment and the processing unit of the server execute computer programs in the corresponding devices, respectively, the method for data migration between cloud storage systems of the present invention is implemented.

Hereinafter, specific functions/steps respectively implemented at the client and the server of the present invention will be described in detail.

Figure 2:
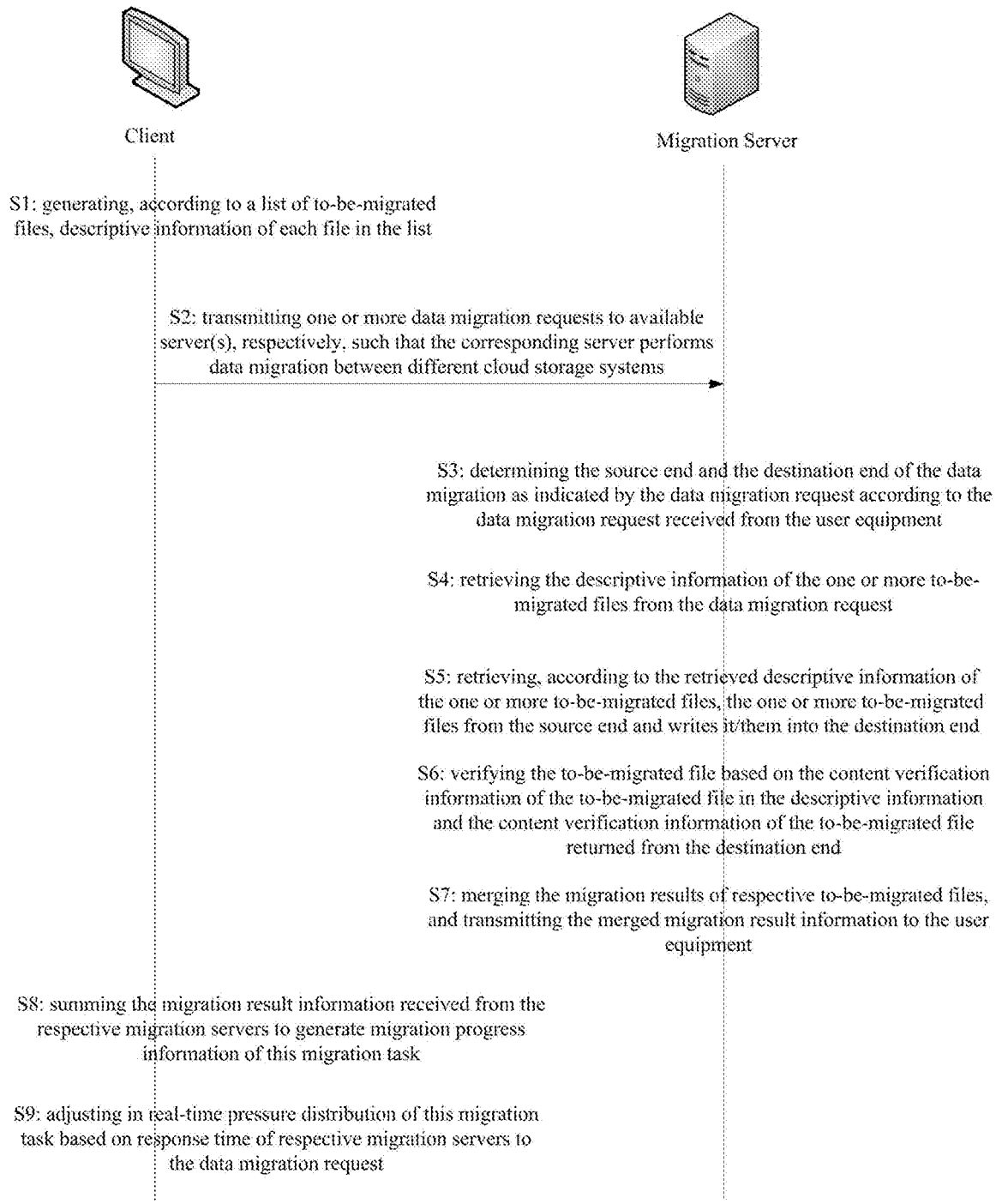
FIG. 2 shows a flow diagram of a method for data migration between cloud storage systems according to an embodiment of the present invention.

FIG. 2 shows an embodiment of the present invention, wherein a method for data migration between cloud storage systems is specifically illustrated.

The data migration method is executed by a data migration system provided by the present invention. The data migration system comprises a client end and a network end. The client end is an initiator of a migration task, while the network end is an executor of the migration task. Particularly, the client is typically installed in respective user equipments, and the network end is typically a migration server. To facilitate the illustration, the client and the user equipment in the description are used equivalently, and the network end and the migration server are used equivalently.

As shown in FIG. 2, in step S1, the client generates, according to a list of to-be-migrated files, descriptive information of each file in the list; in step S2, the client transmits one or more data migration requests to available server(s), respectively, such that the corresponding server performs data migration between different cloud storage systems, wherein each data migration request includes indication information of a source end and a destination end of the data migration and descriptive information of one or more to-be-migrated files; in step S3, the network end determines the source end and the destination end of the data migration as indicated by the data migration request according to the data migration request received from the user equipment; in step S4, the network end retrieves the descriptive information of the one or more to-be-migrated files from the data migration request; in step S5, the network end retrieves, according to the retrieved descriptive information of the one or more to-be-migrated files, the one or more to-be-migrated files from the source end and writes it/them into the destination end.

Specifically, in step S1, the client generates, according to a list of to-be-migrated files, descriptive information of each file in the list.

Here, the list of to-be-migrated files for example may be generated dependent on a DataSource. For example, a user plans to migrate a plurality of files stored in Alibaba cloud OSS (DataSource) to Baidu cloud BOS (DataDestination), wherein the format of the list of files may be defined by the user according to preconfigured rules and the schema format of list is filled in the migration task configuration, and the generated list of files is provided in a form of a file to the client of the data migration system to read.

Typically, each row in the list of files corresponds to a to-be-migrated file, comprising basic information of the to-be-migrated file.

The client parses the information of each row to generate descriptive information of the corresponding to-be-migrated file. The descriptive information for example may be indicated as FileDescriptor, shorted as FD, which may be understood as digestion information of the to-be-migrated file.

Here, FD may be a structured data type and may be extended by map, such that it may describe meta information of all to-be-migrated data.

Typically, FD may include filename, size and content verification information (e.g., MD5). Preferably, the FD for example may include identifier (id), URI and authentication information, etc., wherein the authentication information for example may include username and password of the user at a source end.

Preferably, the client may cache the FD, e.g., placing the generated FD in an FD queue (FDQueue). If the FDQueue has been full, wait; otherwise, directly place it into the FDQueue till the list of files are completely read.

In step S2, the client transmits one or more data migration requests to available server(s), respectively, such that the corresponding server performs data migration between different cloud storage systems, wherein each data migration request includes indication information for the source end and destination end of data migration, as well as descriptive information of one or more to-be-migrated files.

Here, the available server is determined from a preconfigured list of servers. For example, the list of servers is loaded by configuration in the client that initiates the migration task, such that the client may verify whether the servers in the list of servers are available. This may maximally utilize the server resources in the list of servers and simultaneously manage unavailable servers. Typically, the list of servers may be maintained by a ServerManager on the client.

Particularly, a data migration request may include indication of one or more to-be-migrated files. Preferably, the client reads the FD of the to-be-migrated file from the FDQueue and includes it into the data migration request so as to be transmitted to the corresponding server.

For example, the client obtains the FD (a migration task of a single file) from the FDQueue; if the FDQueue is empty or the number of read FDs does not reach a certain threshold, continue to read or wait; when FDs satisfying the threshold number are read from the FDQueue, the client will apply for an available server from the ServerManager and send a data migration request to the server, the data migration request corresponding to this batch of migration subtask; if all servers managed by the ServerManager are busy or all servers are unavailable, block to wait till a server is available; then the data migration request is sent out till the list of files has been completely read and all data migration requests have been sent.

In step S3, the migration server determines, according to the data migration request received from the user equipment, the source end and destination end of the data migration indicated in the data migration request.

Here, the data migration system may define different request types according to different source ends and destination ends.

Typically, the communication between the client and the migration server (network end) is made through Thrift RPC protocol, such that the migration server may distinguish the types of data migration request via RPC interface type, thereby determining the source end and destination end of this data migration.

In step S4, the migration server obtains descriptive information of one or more to-be-migrated files from the data migration request.

For example, the migration server reads the FDs of respective to-be-migrated files from a data migration request.

Preferably, the data migration request transmitted by the client further includes a mode of migrating the to-be-migrated file. In this way, the migration server determines, according to a mode of migration as specified in the data migration request, to-be-migrated files that need to be actually subject to data migration in the to-be-migrated files indicated by the data migration request and then obtains descriptive information of one or more of these to-be-migrated files that need to be actually subjected to data migration.

For example, when the user initiates a data migration task at the client, a migration mode may be configured, such as non-repetitive mode, update mode and coverage mode. Herein in the non-repetitive mode, for example, the files already existing in the destination end will not be migrated. Specifically, if the source end files to be migrated include A, B and C while C already exists in the destination end, then the migration server only migrates A and B. In the update mode, for example, comparing version information of a to-be-migrated file at the source end and the destination end, when the source end has an update, the migration server migrates the file. Specifically, if the latest update date of file A at the source end is Feb. 13, 2017, while the latest update at the destination end is Feb. 1, 2017, then the migration server migrates the file. In the coverage mode, for example, the file is migrated regardless of whether the destination end has the file. Specifically, if the list of migrations includes files A, B and C, the migration server directly migrates these files from the source end to the destination end; if some files are already existent in the destination end, they are directly covered by the migration server.

Here, those skilled in the art should understand although examples of three migration modes are provided here, they should only be understood as explanation to the present invention, but should not be construed as any limitation of the present invention. Any other migration mode, if applicable to the present invention, should be included within the patent protection scope of the present invention.

In this way, the migration server determines the to-be-migrated files actually subjected to data migration according to the migration mode specified in the data migration request, and extracts the FD(s) of the to-be-migrated file(s) from the data migration request.

In step S5, the migration server retrieves, according to the retrieved descriptive information of the one or more to-be-migrated files, the to-be-migrated file (s) from the source end and writes it/them into the destination end.

For example, the migration server obtains respective to-be-migrated files from the source end based on the FDs of respective to-be-migrated files and writes the data into the destination end according to the write (putFile) method of the destination end. In this way, during the whole procedure of data read and data writing, it is not needed to write the data at the source end into the disk one time; instead, the data is directly transferred to the destination end through the migration server.

Here, the migration server may concurrently perform migration of a plurality of files. Preferably, if the size of the file exceeds a certain threshold, the migration server may divide the file into blocks and then perform data migration to respective blocks of the file.

Preferably, after the writing is completed, in step S6, the migration server may verify the to-be-migrated file based on the content verification information of the to-be-migrated file in the descriptive information and the content verification information of the to-be-migrated file returned from the destination end.

For example, the FD may include an MD5 value of the to-be-migrated file, and the destination end, after the to-be-migrated file is successfully written, will also compute the MD5 value of the file and returns the computed MD5 value to the migration server. On this basis, the migration server may compare the two MD5 values to verify the integrity and consistency of the to-be-migrated file.

More preferably, before the verification in step S6, the migration server computes the content verification information for the to-be-migrated file obtained from the source end, and adds the obtained content verification information into the descriptive information of the to-be-migrated file.

Here, those skilled in the art should understand that although the MD5 value is used as an example of the content verification information of the to-be-migrated file, it should only be understood as an explanation of the present invention, but should not be understood as any limitation of the present invention; any other content verification information generated based on the to-be-migrated file content or the algorithm of generating the same, if applicable to the present invention, should all be included within the patent protection scope of the present invention.

According to a preferred embodiment of the method shown in FIG. 2, after the migration server completes writing data into the destination end, in step S7, the migration server merges the migration results of respective to-be-migrated files, and transmits the merged migration result information to the user equipment. Correspondingly, the client receives the migration result information corresponding to the data migration request from the migration server.

For example, the migration server records a migration result of each to-be-migrated file and merges the migration results of respective to-be-migrated files corresponding to a data migration request, and then transmits the merged migration result information to the client corresponding to the data migration request.

More preferably, in step S8, the client sums the migration result information received from the respective migration servers to generate migration progress information of this migration task.

Here, a list of to-be-migrated files corresponds to a migration task, wherein each to-be-migrated file is regarded as a sub-task and a data migration request includes one or more migration sub-tasks, such that the migration task may be split into a plurality of migration sub-tasks and is included in a plurality of data migration requests to be transmitted to a plurality of migration servers. Therefore, the client receives the migration result information executed by these migration servers respectively and sum them to obtain the migration progress information of this migration task, e.g., the number x of files that have been completely migrated, the number x of the files that are being migrated, and file size z that has not been migrated. The migration progress information may be outputted in a form of log.

More preferably, in step S9, the client adjusts in real-time pressure distribution of this migration task based on response time of respective migration servers to the data migration request.

Here, the response time of the migration server to the data migration request, for example, may be determined according to a time interval between the time of sending the data migration request and the time of receiving the migration result information.

The client may adjust in real time the pressure distribution of this migration task based on the response time of respective migration servers, such as start, pause, and migration speed of the migration (sub)task. Herein the migration speed may be adjusted by configuring the concurrent number of the subtasks in respective migration servers.

In addition, respective migration task configuration information of the client is all subjected to hot loading during the migration progress so as to achieve the objective of real-time control of the speed adjusting of the migration task. Particularly, the migration task configuration information includes, but not limited to, a list of to-be-migrated files, a migration mode, a list of servers, and migration speed control.

Figure 3:
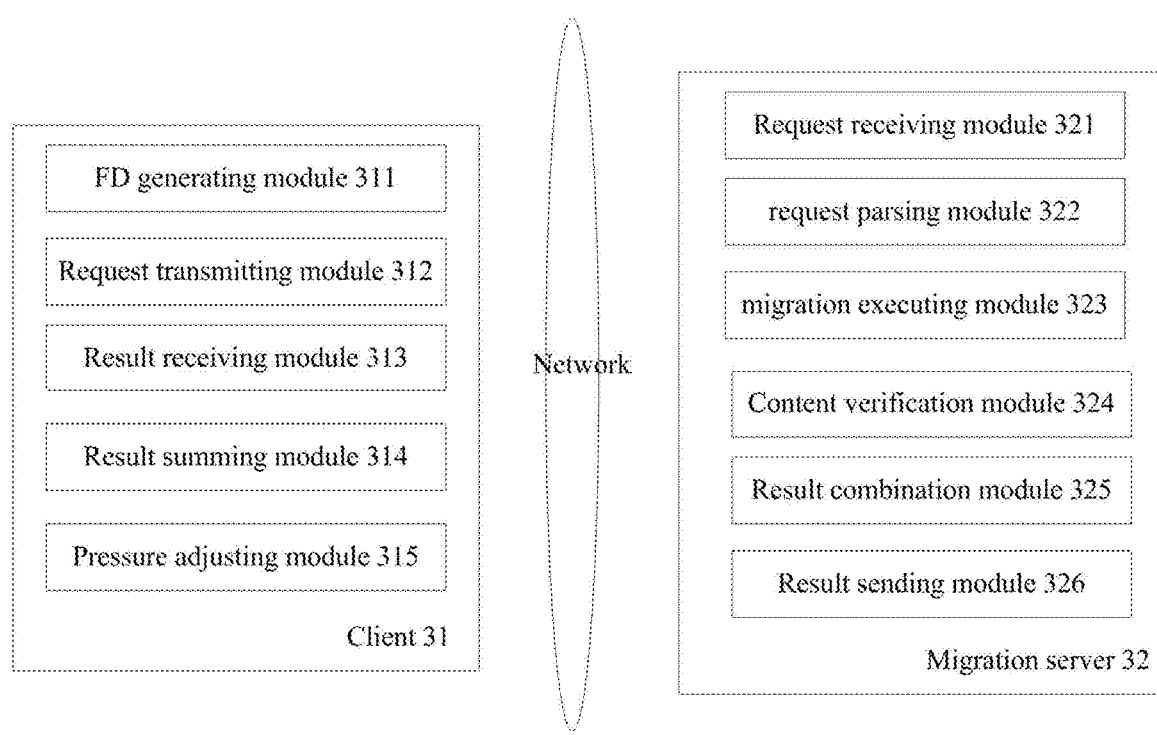
FIG. 3 shows a schematic diagram of a system for data migration between cloud storage systems according to an embodiment of the present invention.

FIG. 3 shows an embodiment of the present invention, wherein a system for data migration between cloud storage systems is specifically shown.

As shown in FIG. 3, the data migration system comprises a client and a network end. The network end is an initiator of a migration task, while the network is an executor of the migration task. Particularly, the client is typically installed in respective user equipments, and the network end is typically a migration server, for example. To facilitate the description, the client and the user equipment are used equivalently herein, while the network end and the migration server are used in equivalence herein.

As shown in FIG. 3, the client 31 comprises an FD generating module 311 and a request transmitting module 312; the migration server 32 comprises a request receiving module 321, a request parsing module 322 and a migration executing module 323.

Specifically, at the client, the FD generating module 311 generates, according to a list of to-be-migrated files, descriptive information of each file in the list; afterwards, the request transmitting module 312 transmits one or more data migration requests to available server(s), respectively, such that the corresponding server performs data migration between different cloud storage systems, wherein each data migration request includes indication information of a source end and a destination end of the data migration and descriptive information of one or more to-be-migrated files; then, at the migration server 32, the request receiving module 321 receives the data migration request from the use equipment; afterwards, the request parsing module 322 determines the source end and the destination end of the data migration as indicated by the data migration request and retrieves the descriptive information of the one or more to-be-migrated files from the data migration request; afterwards, the migration executing module 323 retrieves, according to the retrieved descriptive information of the one or more to-be-migrated files, the one or more to-be-migrated files from the source end and writes it/them into the destination end.

Client 31

The FD generating module 311 generates, according to a list of to-be-migrated files, descriptive information of each file in the list.

Here, the list of to-be-migrated files for example may be generated dependent on a DataSource. For example, a user plans to migrate a plurality of files stored in Alibaba cloud OSS (DataSource) to Baidu cloud BOS (DataDestination), wherein the format of the list of files may be defined by the user according to preconfigured rules and the schema format of list is filled in the migration task configuration, and the generated list of files is provided in a form of a file to the FD generating module 311 on the client to read.

Typically, each row in the list of files corresponds to a to-be-migrated file, comprising basic information of the to-be-migrated file.

The FD generating module 311 parses the information of each row to generate descriptive information of the corresponding to-be-migrated file. The descriptive information for example may be indicated as FileDescriptor, shorted as FD, which may be understood as digestion information of the to-be-migrated file.

Here, FD may be a structured data type and may be extended by map, such that it may describe meta information of all to-be-migrated data.

Typically, FD may include filename, size and content verification information (e.g., MD5). Preferably, the FD for example may include identifier (id), URI and authentication information, etc., wherein the authentication information for example may include username and password of the user at a source end.

Preferably, the client may comprise a FD caching module (not shown) for caching the FD, e.g., FD generating module 311 places the generated FD in an FD queue (FDQueue) in the FD caching module. If the FDQueue has been full, wait; otherwise, directly place it into the FDQueue till the list of files are completely read.

Afterwards, the request transmitting module 312 transmits one or more data migration requests to available server(s), respectively, such that the corresponding server performs data migration between different cloud storage systems, wherein each data migration request includes indication information for the source end and destination end of data migration, as well as descriptive information of one or more to-be-migrated files.

Here, the available server is determined from a preconfigured list of servers. For example, the list of servers is loaded by configuration in the client that initiates the migration task, such that the client may verify whether the servers in the list of servers are available. This may maximally utilize the server resources in the list of servers and simultaneously manage unavailable servers. Typically, the list of servers may be maintained by a ServerManager on the client.

Particularly, a data migration request may include indication of one or more to-be-migrated files. Preferably, the request transmitting module 312 reads the FD of the to-be-migrated file from the FDQueue and includes it into the data migration request so as to be transmitted to the corresponding server.

For example, the request transmitting module 312 request transmitting module 312 obtains the FD (a migration task of a single file) from the FDQueue; if the FDQueue is empty or the number of read FDs does not reach a certain threshold, continue to read or wait; when FDs satisfying the threshold number are read from the FDQueue, the request transmitting module 312 will apply for an available server from the ServerManager and send a data migration request to the server, the data migration request corresponding to this batch of migration subtask; if all servers managed by the ServerManager are busy or all servers are unavailable, block to wait till a server is available; then the data migration request is sent out till the list of files has been completely read and all data migration requests have been sent.

Migration Server 32

The request receiving module 321 receives the data migration request from the use equipment.

Then the request parsing module 322 determines, according to the data migration request received from the user equipment, the source end and destination end of the data migration indicated in the data migration request.

Here, the data migration system may define different request types according to different source ends and destination ends.

Typically, the communication between the client and the migration server (network end) is made through Thrift RPC protocol, such that the request parsing module 322 may distinguish the types of data migration request via RPC interface type, thereby determining the source end and destination end of this data migration.

The request parsing module 322 obtains descriptive information of one or more to-be-migrated files from the data migration request.

For example, the request parsing module 322 reads the FDs of respective to-be-migrated files from a data migration request.

Preferably, the request parsing module 322 may further comprise two units to respectively perform the determination of the source end and the destination end of the data migration and retrieving of FDs.

Preferably, the data migration request transmitted by the client 31 further includes a mode of migrating the to-be-migrated file. In this way, the request parsing module 322 determines, according to a mode of migration as specified in the data migration request, to-be-migrated files that need to be actually subject to data migration in the to-be-migrated files indicated by the data migration request and then obtains descriptive information of one or more of these to-be-migrated files that need to be actually subjected to data migration.

For example, when the user initiates a data migration task at the client 31, a migration mode may be configured, such as non-repetitive mode, update mode and coverage mode. Herein in the non-repetitive mode, for example, the files already existing in the destination end will not be migrated. Specifically, if the source end files to be migrated include A, B and C while C already exists in the destination end, then the migration server 32 only migrates A and B. In the update mode, for example, comparing version information of a to-be-migrated file at the source end and the destination end, when the source end has an update, the migration server 32 migrates the file. Specifically, if the latest update date of file A at the source end is Feb. 13, 2017, while the latest update at the destination end is Feb. 1, 2017, then the migration server 32 migrates the file. In the coverage mode, for example, the file is migrated regardless of whether the destination end has the file. Specifically, if the list of migrations includes files A, B and C, the migration server 32 directly migrates these files from the source end to the destination end; if some files are already existent in the destination end, they are directly covered by the migration server 32.

Here, those skilled in the art should understand although examples of three migration modes are provided here, they should only be understood as explanation to the present invention, but should not be construed as any limitation of the present invention. Any other migration mode, if applicable to the present invention, should be included within the patent protection scope of the present invention.

In this way, the request parsing module 322 determines the to-be-migrated files actually subjected to data migration according to the migration mode specified in the data migration request, and extracts the FD(s) of the to-be-migrated file(s) from the data migration request. Preferably, the request parsing module 322 may further comprise a certain filtering unit to perform the filtering function of actually migrated files.

Afterwards, the migration executing module 323 retrieves the to-be-migrated file (s) from the source end and writes it/them into the destination end according to the descriptive information of the one or more to-be-migrated files extracted by the request parsing module 322.

For example, the migration server obtains respective to-be-migrated files from the source end based on the FDs of respective to-be-migrated files and writes the data into the destination end according to the write (putFile) method of the destination end. In this way, during the whole procedure of data read and data writing, it is not needed to write the data at the source end into the disk one time; instead, the data is directly transferred to the destination end through the migration executing module 323.

Here, the migration executing module 323 may concurrently perform migration of a plurality of files. Preferably, if the size of the file exceeds a certain threshold, the migration executing module 323 may divide the file into blocks and then perform data migration to respective blocks of the file.

Preferably, the migration server 32 may further comprise a content verification module 324. After the writing is completed, the content verification module may verify the to-be-migrated file based on the content verification information of the to-be-migrated file in the descriptive information and the content verification information of the to-be-migrated file returned from the destination end.

For example, the FD may include an MD5 value of the to-be-migrated file, and the destination end, after the to-be-migrated file is successfully written, will also compute the MD5 value of the file and returns the computed MD5 value to the migration server 32. On this basis, the content verification module may compare the two MD5 values to verify the integrity and consistency of the to-be-migrated file.

More preferably, before the verification, the content verification module computes the content verification information for the to-be-migrated file obtained from the source end, and adds the obtained content verification information into the descriptive information of the to-be-migrated file.

Here, those skilled in the art should understand that although the MD5 value is used as an example of the content verification information of the to-be-migrated file, it should only be understood as an explanation of the present invention, but should not be understood as any limitation of the present invention; any other content verification information generated based on the to-be-migrated file content or the algorithm of generating the same, if applicable to the present invention, should all be included within the patent protection scope of the present invention.

According to a preferred embodiment of the method shown in FIG. 3, the migration server 32 may further comprise a result combination module 325 and a result sending module 326, and the client 31 may further comprise a result receiving module 313. After the migration server completes writing data into the destination end, the result combination module merges the migration results of respective to-be-migrated files, and the result sending module transmits the merged migration result information to the client 31. Correspondingly, the result receiving module receives the migration result information corresponding to the data migration request from the migration server 32.

Preferably, the result combination module and the request receiving module 321 may integrated together.

For example, the result combination module records a migration result of each to-be-migrated file and merges the migration results of respective to-be-migrated files corresponding to a data migration request, and then the result sending module transmits the merged migration result information to the client 31 corresponding to the data migration request.

More preferably, the client 31 may further comprise a result summing module 314. The result summing module sums the migration result information received from the respective migration servers 32 to generate migration progress information of this migration task.

Here, a list of to-be-migrated files corresponds to a migration task, wherein each to-be-migrated file is regarded as a sub-task and a data migration request includes one or more migration sub-tasks, such that the migration task may be split into a plurality of migration sub-tasks and is included in a plurality of data migration requests to be transmitted to a plurality of migration servers. Therefore, the result receiving module receives the migration result information executed by these migration servers respectively and the result summing module sum them to obtain the migration progress information of this migration task, e.g., the number x of files that have been completely migrated, the number x of the files that are being migrated, and file size z that has not been migrated. The migration progress information may be outputted in a form of log.

More preferably, the client 31 may further comprise a pressure adjusting module 315. The pressure adjusting module adjusts in real-time pressure distribution of this migration task based on response time of respective migration servers 32 to the data migration request.

Here, the response time of the migration server 32 to the data migration request, for example, may be determined according to a time interval between the time of sending the data migration request and the time of receiving the migration result information.

The pressure adjusting module may adjust in real time the pressure distribution of this migration task based on the response time of respective migration servers, such as start, pause, and migration speed of the migration (sub)task.

Herein the migration speed may be adjusted by configuring the concurrent number of the subtasks in respective migration servers 32.

In addition, respective migration task configuration information of the client 31 is all subjected to hot loading during the migration progress so as to achieve the objective of real-time control of the speed adjusting of the migration task. Particularly, the migration task configuration information includes, but not limited to, a list of to-be-migrated files, a migration mode, a list of servers, and migration speed control.

The present invention may employ one or more computer-readable mediums. The computer readable medium may be a computer-readable signal medium or a computer-readable storage medium. The computer-readable storage medium for example may be, but not limited to, an electrical, magnetic, optical, electromagnetic, infrared, or semiconductor system, apparatus or device, or any combination of the above. More specific examples (a non-exhaustive list) of the computer readable storage medium include: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above. Herein, the computer-readable storage medium may be any tangible medium embodying or storing programs, which programs may be used by an instruction execution system, apparatus or device or used by a combination of the above.

The computer-readable signal medium may include data signals propagated in a baseband or as apart of carriers, bearing computer-readable program code. The data signal such propagated may adopt a plurality of forms, including, but not limited to, electromagnetic signals, optical signals, or any appropriate combinations thereof. The computer-readable signal medium may also be any computer-readable medium other than the computer-readable storage medium, which computer-readable medium may transmit, propagate or transfer programs used by the instruction executing system, apparatus or device or used by a combination thereof.

The program code embodied on a computer readable medium may be transferred using any appropriate medium, including, but not limited to, wireless, wired, cable, RF, etc., or any appropriate combination thereof.

Computer program codes for executing the operations of the present invention may be compiled in one or more programming languages or a combination thereof, the programming languages include object-oriented programming languages, such as Java, Smalltalk, C++, and also include conventional procedural programming languages such as "C" language or similar programming language. The program codes may be completely executed on a user computer, or partially executed on a user computer, or executed as an independent software package, or partially executed on the user computer and partially executed on the remote computer, or completely executed on the remote computer. In a scenario involving the remote computer, the remote computer may be connected to the user computer through any kind of network (including local area network (LAN) or wide area network (WAN)), or may be connected to an external computer (e.g., connected via the Internet through an Internet service provider).

The computer program code for executing the operation of the present invention comprises two portions that are separately executed on a user equipment and the server. When the computer program codes separately suitable for the user equipment and the server, the method of the present invention is implemented.

It should be noted that the present invention may be implemented in software and/or a combination of software and hardware. For example, each module of the present invention may be implemented by an application-specific integrated circuit (ASIC) or any other similar hardware device. Additionally, some steps or functions of the present invention may be implemented by hardware, for example, a circuit cooperating with the processor so as to implement various steps or functions.

To those skilled in the art, it is apparent that the present invention is not limited to the details of the above illustrative embodiments, and the present invention may be implemented with other embodiments without departing from the spirit or basic features of the present invention. Thus, in any way, the embodiments should be regarded as illustrative, not limitative; the scope of the present invention is limited by the appended claims, instead of the above depiction. Thus, all variations intended to fall into the meaning and scope of equivalent elements of the claims should be covered within the present invention. A plurality of units or modules stated in a system claim may also be implemented by a single unit or module through software or hardware.

What is claimed is:

1. A method for data migration between cloud storage systems, wherein at a user equipment, the method comprises:
    generating, according to a list of to-be-migrated files, descriptive information of each file in the list; and
    transmitting one or more data migration requests to available server(s), respectively, such that the corresponding server performs data migration between different cloud storage systems, wherein each data migration request includes indication information of a source end and a destination end of the data migration and descriptive information of one or more to-be-migrated files;
    wherein the method further comprises:
    receiving, from the server, migration result information corresponding to the data migration request; and
    adjusting, in real-time, pressure distribution of the current migration task according to response time of respective servers to the data migration request, wherein the response time of the respective servers to the data migration request is determined according to a time interval between time of transmitting the data migration request and time of receiving the migration result information.

2. The method according to claim 1, wherein the data migration request further comprises a migration mode for the to-be-migrated files.

3. The method according to claim 1, wherein the available server is determined from a pre-configured list of servers.

4. The method according to claim 1, wherein the method further comprises:
    summing the migration result information from respective servers to generate migration progress information of the current migration task.

5. A non-transitory computer storage medium storing a computer program, wherein the computer program when executed by one or more processors, causes the one or more processors to perform the method according to claim 1.

6. A method for data migration between cloud storage systems, wherein at a network device, the method comprises:
    determining the source end and the destination end of data migration as indicated by a data migration request according to the data migration request received from a user equipment;
    retrieving descriptive information of one or more to-be-migrated files from the data migration request; and
    retrieving the one or more to-be-migrated files from the source end and writes it/them into the destination end;
    wherein the method further comprises:
    merging migration results of the one or more to-be-migrated files; and
    transmitting the merged migration result information to the user equipment to cause the user equipment to adjust, in real-time, pressure distribution of the current migration task according to response time of respective network devices to the data migration request, wherein the response time of the respective network devices to the data migration request is determined according to a time interval between time of transmitting the data migration request by the user equipment and time of receiving the migration result information by the user equipment.

7. The method according to claim 6, wherein the method further comprises:
    verifying the to-be-migrated file based on content verification information of the to-be-migrated file in the descriptive information and content verification information of the to-be-migrated file returned from the destination end.

8. The method according to claim 7, wherein the method further comprises:
    computing content verification information for the to-be-migrated file retrieved from the source end, and adding the computed content verification information to the descriptive information of the to-be-migrated file.

9. An apparatus for data migration between cloud storage systems, wherein the apparatus is arranged at a network device, and the apparatus comprises:
    at least one processor; and
    a memory storing instructions, the instructions when executed by the at least one processor, cause the at least one processor to perform the operations of the method according to claim 6.

10. The apparatus according to claim 9, wherein the operations further comprise:
    verifying the to-be-migrated file based on content verification information of the to-be-migrated file in the descriptive information and content verification information of the to-be-migrated file returned from the destination end.

11. The apparatus according to claim 9, wherein, the one or more to-be-migrated files that need to be actually subject to data migration are determined based on a migration mode specified in the data migration request.

12. A non-transitory computer storage medium storing a computer program, wherein the computer program when executed by one or more processors, causes the one or more processors to perform the method according to claim 6.

13. An apparatus for data migration between cloud storage systems, wherein the apparatus is arranged at a user equipment, the apparatus comprises:
    at least one processor; and
    a memory storing instructions, the instructions when executed by the at least one processor, cause the at least one processor to perform operations, the operations comprising:

generating, according to a list of to-be-migrated files, descriptive information of each file in the list; and transmitting one or more data migration requests to available server(s), respectively, such that the corresponding server performs data migration between different cloud storage systems, wherein each data migration request includes indication information of a source end and a destination end of the data migration and descriptive information of one or more to-be-migrated files;

wherein the operations further comprise:

receiving, from the server, migration result information corresponding to the data migration request; and adjusting, in real-time, pressure distribution of the current migration task according to response time of respective servers to the data migration request, wherein the response time of the respective servers to the data migration request is determined according to a time interval between time of transmitting the data migration request and time of receiving the migration result information.

14. The apparatus according to claim 13, wherein the data migration request further comprises: a migration mode for the to-be-migrated files.

\* \* \* \* \*